Jan. 14, 1969 D. L. LINNING 3,421,979
NUCLEAR REACTOR FUEL ELEMENTS
Filed Dec. 19, 1966
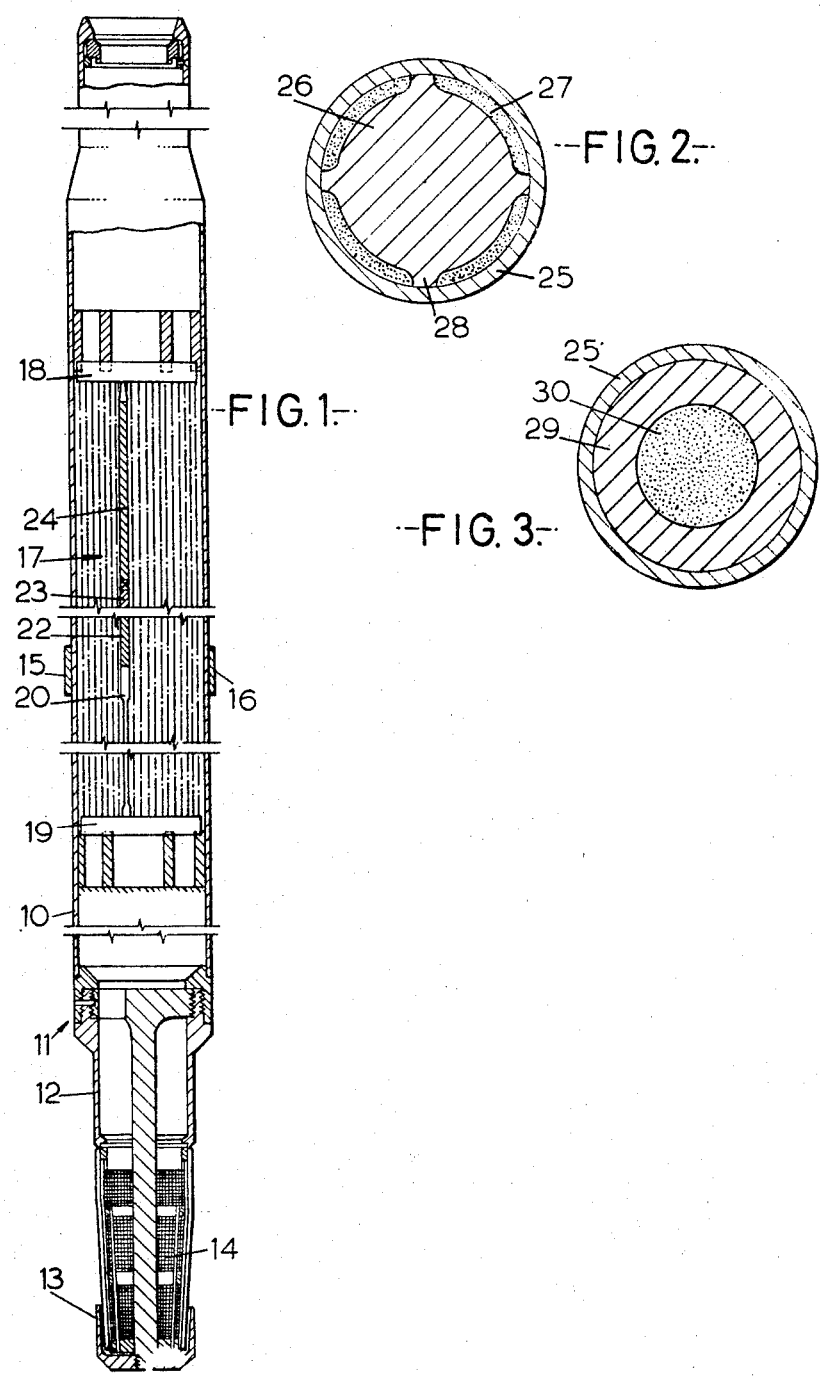

United States Patent Office 3,421,979
Patented Jan. 14, 1969

3,421,979
NUCLEAR REACTOR FUEL ELEMENTS
David Lees Linning, Culcheth, Warrington, England, assignor to United Kingdom Atomic Energy Authority, London, England
Filed Dec. 19, 1966, Ser. No. 602,850
Claims priority, application Great Britain, Dec. 23, 1965, 54,510/65
U.S. Cl. 176—68
Int. Cl. G21c 3/16
6 Claims

ABSTRACT OF THE DISCLOSURE

For a fast nuclear reactor, a fuel element of the kind having ceramic fuel in metallic sheathing, wherein the fuel is divided into a central zone and an outer zone or interlayer interposed contiguously between the central zone and the sheath, and fissile fuel is predominantly in the central zone with fertile fuel predominantly in the interlayer which has thermal insulating properties whereby the operating temperature of the fuel can be increased so as to lower its compressive creep resistance to enable irradiation-induced swelling of the fuel to be absorbed in voidage distributed in the fuel by virtue of its aggregated density being arranged to be less than (for example 85% of) maximum theoretical density. Where plutonium fissile atoms are employed, they are included in the central zone, while the interlayer is of natural or depleted uranium.

---

The present invention relates to fuel elements for fast nuclear reactors having fissile and fertile fuel, which is preferably ceramic, in a closely fitting metal sheath. Current research on ceramic fuels is showing that fuel swelling can be a prime cause of fuel element failure and thereby produce a limit on attainable burn-up of heavy atoms. There are strong economic incentives to achieve as high a fraction of heavy atom burn-up as possible in fast reactors.

A significant feature of fuel swelling which is caused by the solid and gaseous fission products is that it can occur in such a way as to extend the perimeter of the fuel, thereby stretching the closely fitting sheath while at the same time leaving an unoccupied voidage in the central region of the fuel element. The basic reason for this is that the outer rim of fuel which swells continuously under irradiation behaves like a continuous expanding circular arch. The idea of a continuous arch is only tenable if the fuel is strong enough in its outer regions to stretch and cause failure of the sheath. At typical surface fuel temperatures for fast reactors, this is generally the case, since, although ceramic fuel does tend to become plastic at high temperatures, it is not likely to be adequately plastic below 1,000° C.

It is an object of the invention to overcome this difficulty by arranging for fuel swelling to be associated mainly with hotter and therefore more plastic fuel, so that as swelling proceeds the fuel will flow or deform into the available voidage. At the same time, it is highly desirable that this should be done without either loss of average fuel density in the reactor core as a whole, since this has an important effect on the economics of the system, or with increase of sheathing temperature, since sheath strength is liable to significant reductions with temperature increase. These three objectives can be simultaneously achieved, according to the present invention, by arranging that the fissile fuel is predominantly in a central zone and the fertile fuel predominantly in an outer zone interposed contiguously between the central zone and the sheath. With this arrangement fuel burn-up will take place predominantly in the central zone where the fuel is hot and plastic. The outer zone will be subject to a certain amount of burn-up but in the event that fuel swelling problems do prove to be a limiting factor on attainable burn-up, a two-zone form of fuel in accordance with the invention can be expected to give a significant extension of that limit.

Where plutonium is used to provide the enrichment required for a fast nuclear reactor the central zone may comprise a ceramic compound of plutonium and the outer zone a ceramic compound of natural or depleted uranium. Preferably these compounds are of the same type, for example, dioxides, and are in direct contact at the interface of the zones. This direct contact avoids any need for the provision of a peripheral layer on either of the zones to act as an interlayer between them. Although fuels showing greatest reduction of creep strength with temperature will be preferred, the invention is applicable generally to any ceramic fuel, such as oxide, carbide, silicide and nitride.

There are various ways in which the arrangement in accordance with the invention can be achieved in practice. These will be further explained with the aid of the accompanying drawings in which:

FIG. 1 is a longitudinal section of a fuel assembly for a liquid metal cooled fast reactor, the fuel in this assembly being contained in fuel pins, and FIGS. 2 and 3 are cross sections to an enlarged scale through two forms of fuel pin embodying the invention in a manner suitable for use in the fuel assembly as shown in FIG. 1.

In FIG. 1 an outer hexagonal casing 10 of the assembly has a bottom fitting 11 comprising spaced cylindrical bearing surfaces 12 and 13 for fitting into a socket of a reactor core support structure so that the assembly is supported in cantilever fashion by this structure. Between the bearing surfaces there is a stainless steel knitmesh filter 14 which enables coolant (assumed in these examples to be sodium) supplied to an inlet plenum incorporated in the core support structure to enter into the bottom of the casing 10 and to be forced upwards therein. When positioned in the core each assembly is separated from its neighbours only by narrow gaps which are predetermined by the pitch of the sockets in the core support structure and by corner abutments or pads such as 15 and 16 projecting from the casing.

The fuel pins indicated 17 are clustered within the casing 10 in parallel array on a triangular lattice, the lattice pitch being large enough to ensure that the pins do not come into contact with one another; they float captively between top and bottom support plates 18 and 19 and are located transversely at intervals along the length of the cluster by grid structures (not shown). The coolant forced upwards in the casing therefore flows longitudinally over the pins for removal of the heat generated thereby.

The fuel pin appearing in section in FIG. 1 illustrates how a void length 20 amounting to about half the length of each pin to act as a reservoir for gases released by the fuel in service is arranged at the lower end. This void length is provided since the pins are assumed to be of the sealed type. Above the void length there are three sections represented diagrammatically, namely a lower breeder section 22, a fuel section 23 and an upper breeder section 24. It is with the fuel section that the invention is primarily concerned and therefore the content of the breeder sections can be arranged in any way which is appropriate in combination with the fuel section arrangements now to be described with reference to FIGS. 2 and 3.

In FIG. 2 the fuel contained within thin-walled cylindrical sheathing 25 is divided into two zones having different concentrations of fissile atoms, the zone 26 of higher fissile atom concentration being at least for the most part inside the outer zone 27. In the extreme, the inner zone 26 may have concentrated in it practically all of the fissile content of the fuel while the outer zone 27 is principally of fertile material. Thus, where plutonium atoms are employed for enrichment, the inner zone may be solely ceramic plutonium while the outer zone is of ceramic uranium which is preferably depleted in fissile isotope. Although the fissile atoms are advantageously segregated to the utmost into the inner zone, it is not necessarily best that all the fertile atoms are segregated into the outer zone. If the segregation were to be so complete, it is likely that the temperatures towards the centre would exceed the melting point of the inner zone, especially if this zone is constituted by an oxide. Oxides characteristically have low thermal conductivities and therefore in FIG. 2, which is based on the use of oxide fuel, the plutonium atoms in the inner zone 26 are diluted with fertile uranium atoms. In greater detail, the inner zone is of $(UPu)O_2$, possibly to a slightly nonstoichiometric composition, with the uranium at the natural concentration of the 235 isotope and with the plutonium enrichment at a level of about 27% for example. The outer zone 27 is a ceramic compound of the same type so that the two zones can be in direct contact without any need for an extra layer between them. The outer zone in FIG. 2 is therefore natural or depleted $UO_2$.

In conjunction with the two-zone arrangement thus far described, it is essential to provide distributed voidage. Based on the provision of between 1 and 2% voidage per designed percent of maximum burn-up of heavy atoms, an aggregate voidage amounting to at least 15% of the fuel volume is considered appropriate. Primarily such a figure of voidage is related to the inner zone where the majority of fission occurs. The same criterion does not apply to the same extent to the outer zone. Therefore the density of the outer zone may be different from that of the inner zone, for example higher, but in the present example it will be assumed that the densities are approximately the same. Stacked pellets of which the inner zone is composed are presintered to the requisite density, for example, about 80% of the maximum theoretical density. If, in the alternative, the pellets were to be made in an annular shape, the central hole would contribute to the requisite voidage and less would be needed as porosity in the fuel. The outer zone may be introduced as powder in which case the packing density is controlled. Locating ribs, such as 28, are formed on the pellets of the inner zone for centering the sheathing 25.

The thickness of the outer zone in FIG. 2 is intended, on the basis of the heat generation in the inner and outer zones being in the ratio of 22.6:1, to make the inner zone surface (excluding the ribs 28) about 400° C. hotter than the outer surface of the outer zone. With the fuel pin in service at the design heat output rating this outer surface is likely to have a temperature between 700 and 800° C. in the region of maximum burn-up of the fuel, i.e. approximately the mid-length of the fuelled section of the pin, and therefore the inner zone surface temperature can be expected to exceed 1,000° C.

By virtue of this surface temperature, all of the enriched fuel, at least in the region of maximum burn-up of the fuel pin, becomes subject to a temperature greater than 1,000° C. and consequently there is created throughout this fuel such reduced resistance to compressive creep that irradiation-induced swelling can be absorbed in the local voidage without exerting undue pressure on the outer zone, that is to say, pressure which will overstrain the metal sheathing. An indication of the extent to which the compressive creep strength of ceramic fuels is reduced with increasing temperature can be gained from the paper by Armstrong et al. at pp. 133 to 141 of Journal of Nuclear Materials, 7 No. 2 (1962).

Although the ribs 28 will be cooler and hence stronger than the rest of the inner zone, they are no longer part of a continuous arch and by being well separated may not exert any greater pressures on the outer zone or sheathing; even if they prove to be virtually undeformable it is conceivable that they will tend to embed themselves into the main body of the inner zone. The ribs therefore illustrate that the interlayer represented by the outer zone can serve the intended function merely by rendering discontinuous such portions of the enriched fuel as are in direct heat transfer relationship with the metal sheathing.

The surface temperatures quoted above are referred to the maximum burn-up region of the fuel because in an elongated fuel element it is generally not feasible or even necessary to aim for such high surface temperatures towards the ends of the element. Typically there is a downward temperature gradient towards the ends which results from a lowering of neutron flux density and hence fission rate. The lower fission rate implies less swelling tendency and hence less need for measures to avoid swelling at the external surface.

Some fission will occur in the outer zone and is likely to increase as burn-up proceeds since more fertile material is present in the outer zone than the inner zone and therefore more new fissile atoms per unit volume are bred into the outer zone. For example, an initial fission rate distribution of 5:1 could reduce to 3:1 at an average burn-up of 10%.

Nevertheless, it can be expected that an extension of burn-up limits would be obtainable and there is the advantage that maximum use is made of fertile material to assist in breeding.

FIG. 3 is a modification of FIG. 2 using ceramic fuel of higher thermal conductivity, such as monocarbide. The outer zone 29 is continuous and of uniform thickness and is of natural or depleted UC; since it is thicker than the equivalent outer zone in FIG. 2 it is conveniently made in the form of hollow annular pellets into which the enriched fuel, i.e. (UPu)C, is packed as powder to form the inner zone 30. As before, the plutonium enrichment lies exclusively in the inner zone.

In general the manufacture will depend on the nature of the materials, the required thicknesses and the densities. Apart from processes involving preforming one component and filling the other as powder, others which are open to consideration according to the circumstances are flame spraying and coextrusion. For densifying packed powder interlayers, or simply for ensuring tight engagement with the sheathing, use could be made of a rotary swaging or explosive forming operation performed on the sheathing after filling.

While the above examples deal specifically in many respects with particular circumstances, it will be appreciated that many variations of the invention are possible within the scope as defined by the appended claims and without departing from the spirit and general purpose of the invention as herein described. With regard to such variations, a possibility which may be worthy of mention is that of adding to the interlayer a thermal insulating material which does not contain fissile or fertile atoms. Such material would be a diluent for atoms of these kinds already present in the interlayer. For instance, if beryllia is required for countering reactivity gain on loss of coolant in the reactor, such beryllia may be mixed in with the interlayer. It also follows that an interlayer in accordance with this invention could be used in place of the one without fissile or fertile atoms which is employed in an application of even date by K. M. Swanson at the external cooled surface of a type of fuel element having internal as well as external cooled surfaces.

What I claim is:

1. A nuclear reactor fuel element comprising metallic sheathing for exposure externally to a flowing coolant, ceramic nuclear fuel contained within the sheathing and possessing in aggregate a density which is less than the maximum theoretical density in order to include distributed voidage, and a solid interlayer disposed between and directly contacting both the sheathing and the fuel, said interlayer containing fertile atoms but being depleted in fissile atoms relative to the fuel and said interlayer having thermal insulating properties to increase the operating temperature of the fuel, and hence lower the compressive creep resistance thereof, whereby to enable absorption in the voidage of irradiation-induced swelling of the fuel.

2. A nuclear reactor fuel element according to claim 1, wherein the interlayer is continuous and of uniform thickness.

3. A nuclear reactor fuel element according to claim 1, wherein the fuel contains plutonium fissile atoms and the interlayer comprises a ceramic compound of uranium having no more than the natural concentration of fissile atoms.

4. A nuclear reactor fuel element according to claim 3, wherein the interlayer is exclusively of a ceramic compound of depleted uranium.

5. A nuclear reactor fuel element according to claim 1, wherein the fuel density is less than 85% of the maximum theoretical density.

6. A nuclear reactor fuel element according to claim 1, wherein the interlayer has a predetermined thickness such that, when the element is in service at the design heat output rating, the temperature at the adjoining fuel surface is at least 1,000° C. in at least the region of maximum burn-up of the fuel.

References Cited

UNITED STATES PATENTS

| | | | |
|---|---|---|---|
| 2,852,460 | 9/1958 | Abbott et al. | 176—68 |
| 2,853,446 | 9/1958 | Abbott et al. | 176—68 |
| 2,864,758 | 12/1958 | Shackelford | 176—91 X |
| 3,042,598 | 7/1962 | Crowther | 176—68 X |
| 3,072,555 | 1/1963 | Barth et al. | 176—72 X |
| 3,085,059 | 4/1963 | Burnham | 176—73 |
| 3,211,626 | 10/1965 | Nerenstone et al. | 176—73 |
| 3,215,607 | 11/1965 | Lackey | 176—73 X |
| 3,230,151 | 1/1966 | Mills et al. | 176—67 X |
| 3,238,108 | 3/1966 | Deddens et al. | 176—73 X |
| 3,244,599 | 4/1966 | Hildebrand | 176—72 |
| 3,275,525 | 9/1966 | Bloomster et al. | 176—73 |
| 3,291,696 | 12/1966 | Sugimoto et al. | 176—68 |

BENJAMIN R. PADGETT, *Primary Examiner.*

MELVIN J. SCOLNICK, *Assistant Examiner.*

U.S. Cl. X.R.

176—72, 89